Figure 1:
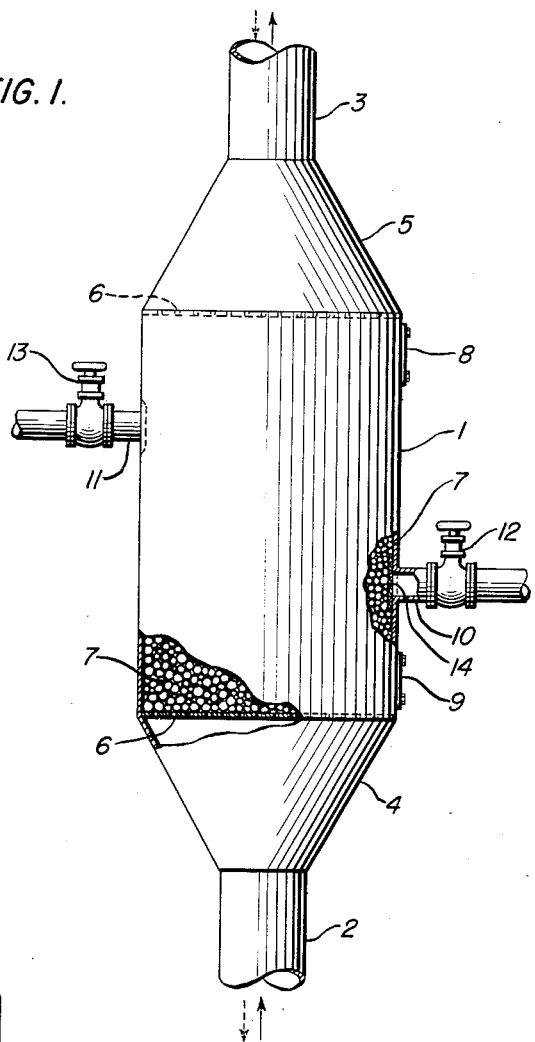

March 20, 1951 — D. J. BERGMAN — 2,545,682
EXHAUST GAS SILENCER AND PRESSURE REDUCER
WITH PLURAL VALVED OUTLETS
Filed July 30, 1947

INVENTOR:
Donald J. Bergman
By:
Maynard P. Venema
ATTORNEY

UNITED STATES PATENT OFFICE 2,545,682

EXHAUST GAS SILENCER AND PRESSURE REDUCER WITH PLURAL VALVED OUTLETS

Donald J. Bergman, Kenilworth, Ill., assignor to Universal Oil Products Company, Chicago, Ill., a corporation of Delaware Application July 30, 1947, Serial No. 764,785

4 Claims. (Cl. 181—50)

This invention relates to an improved type of exhaust gas pressure reducing and noise muffling or silencing apparatus. More specifically, the invention concerns an improved silencer having means to adjust the amount of pressure reduction which may be exerted on an exhaust stream, as well as having an improved removable packing and baffling arrangement suitable for use with gas streams containing suspended erosive material.

It is a principal object of the invention to provide an improved exhaust gas silencer having an easily removable baffling or packing material therein, with the latter providing a multiplicity of small flow streams and a resulting reduced velocity compared with that from an orifice plate or pressure reducing valve taking the same pressure drop.

It is another object of the invention to provide a pressure reducing and silencing apparatus with means for adjusting the amount of pressure reduction on the gas stream being discharged through the device.

It is a still further object of the invention to provide a form and type of packing material suitable to withstand the detrimental effect of erosion from entrained solid particles within the gas stream.

The usual exhaust gas muffler is equipped with a plurality of fixed baffles arranged to provide a tortuous path, or paths, for the flow stream, for the purpose of effecting a reduction of the noise that normally occurs when a stream passes from a superatmospheric pressure zone through a valve or orifice to the atmosphere. A fixed baffling arrangement of course provides a non-adjustable pressure reduction on the exhaust stream and is therefore undesirable for use in many installations having varying operating conditions.

Broadly, the improved apparatus of this invention comprises a chamber or housing having flow stream inlet and outlet openings therein, removable packing material within said housing providing a multiplicity of small and tortuous flow paths therethrough, adjustable by-pass outlets spaced along the sides of the chamber and connecting with the interior thereof in a manner to permit withdrawal of a portion of the gas stream intermediate the length of the packed portion of the apparatus.

A preferable form of the apparatus employs a bed of solid cast iron or ceramic balls which may be supported on a grating within the silencer housing. The balls may be supplied with varying diameters but of sufficient size and density to preclude their fluidization and to provide a packed bed that will break the exhaust gas stream into a multiplicity of small gas streams without being lifted by the gas pressure supply to the silencing and pressure reducing device. A round or spherical type of packing is especially desirable to withstand erosive action from entrained solid matter that may be present in the gas stream, in that the packing will continue to maintain a compact bed as the individual balls are eroded. A packed bed of baffling material also has an advantage in that the packing is removable and the depth of the bed may be readily varied.

The adjustable outlets which are spaced along the walls of the chamber throughout the height or length of the bed provide by-pass gas outlets and means for varying the amount of pressure reduction on the exhaust gas stream. The adjustable pressure reducing feature is one of the principal advantages of the present invention and makes possible its use in many instances where a customary type of muffling apparatus would prove inadequate. Many installations of silencer and pressure reducing devices are required where the operation of the exhausting unit varies in pressure, or alternatively, the unit is at times operated in a variable manner and adjustment means in the silencing and pressure reducing device to accommodate the varying pressures and gas velocities is a very desirable feature.

For example, in gas or vapor exhaust lines from contacting chambers employing fluidized finely divided solid contact material, as is used in the petroleum and chemical industries, large quantities of hot gaseous material at superatmospheric pressure are discharged to the atmosphere.

In a specific case, a fluidized catalyst regenerator employs a large quantity of air or oxidizing gas to remove contaminating carbonaceous matter from the catalyst particles by burning the carbonaceous deposit in an aerated and fluidized state within the chamber. The chamber is normally operated at a pressure above atmospheric and the exhaust flue gases are discharged from the chamber through a pressure reducing control valve to the atmosphere. This valve may handle a pressure drop of 5 to 20 pounds per square inch, or more, and there may result considerable noise if the flow stream is unbroken and unmuffled. There is also a certain amount of entrained catalyst remaining in the flue gas exhaust stream and these finely divided particles passing at a high velocity through the pressure reducing valve cause excessive erosive wear on the downstream piping and portions of the valve.

The installation of a pressure reducing type of silencer as provided by this invention, in a position beyond the control valve, makes it possible to operate the valve to effect a smaller amount of pressure reduction, the silencer taking a substantial proportion of the total pressure reduction to be effected on the gas stream. This type of an installation eliminates excessive wear on the control valve and piping and accompanying undesirable shut downs of the conversion unit. The pressure reducing valve can also be smaller since it is working in a higher pressure range.

Reference to the accompanying drawing and the following description thereof will serve to clarify the construction and operation of the improved apparatus.

Figure 1 of the drawing is an elevational view, partially in section, illustrating the general construction and arrangement of one preferred form of the silencing and pressure reducing device.

Figure 2:
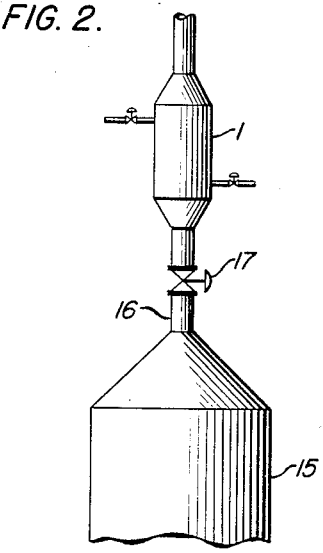

Figure 2 of the drawing illustrates diagrammatically the use of the improved apparatus in an exhaust line above a pressure chamber such as a catalyst regenerator, which continuously discharges a hot gaseous stream.

Referring now to Figure 1 of the drawing, there is shown a chamber or housing 1 having an inlet opening 2 and an opposite outlet opening 3 at opposite ends thereof. The inlet and outlet openings, or ports 2 and 3, connect with the housing 1 by means of the respective tapered sections 4 and 5. The interior of the housing 1 is provided at each end thereof with perforated plates or gratings 6, and a confined bed of loose and removable packing material 7, which as noted hereinabove may comprise substantially solid balls of a hard erosion, and heat resistant material. The balls may be of steel, cast iron, a dense and hard ceramic material, or of other suitable refractory substance. The diameter of the balls may also vary in order to provide a relatively compact bed and to give a desired pressure reducing effect on the gas stream. The normal range of diameters may be of the order of from one-half inch to three inches, however, as mentioned hereinabove, the arrangement and diameter chosen will depend on the velocity and pressure of the exhaust stream which is to be silenced and controlled.

Suitable removable plates or doors 8 and 9 are provided at the upper and lower ends of the housing 1, in order that the balls or packing may be placed and removed or alternately, the height of the bed adjusted within the chamber to provide a desired amount of pressure reduction for a given installation.

Outlet conduits 10 and 11 containing respectively the adjustable valves 12 and 13, also provide means for removing a portion of the charge gas stream thereby allowing an adjustment of the pressure drop through the bed 7 with a given depth of packing. A suitable screen or perforated plate 14 may be placed over each of the openings to the by-pass outlets in order to prevent the packing from lodging within the conduits or valves. In the particular embodiment shown, only two by-pass outlet valves and conduits are indicated, however, a plurality of small by-pass openings with adjustable valves may be spaced along the walls of the housing 1, each communicating with the interior thereof, such that a high degree of adjustability in controlling the extent of pressure reduction, may be obtained.

A packed bed of substantially spherical or ball shaped particles is in general the most desirable form, however, a removable packing of material having other than a spherical shape may be used to form a suitable removable packing providing an obstructed path or series of paths for the exhaust gas stream.

In Figure 2 of the drawing, there is indicated a pressure chamber 15, which may be of the type, as noted hereinabove, having a large quantity of flue gas or waste gas being discharged therefrom directly to the atmosphere, or by way of heat recovery apparatus receiving the hot gases at a relatively low pressure. The exhaust gas stream leaves the top of the chamber through conduit 16, passes through a control valve 17 and is charged to a pressure reducing apparatus 1, such as has been described in Figure 1 of the drawing. In operation, the improved silencing and pressure reducing apparatus may be constructed and operated to withstand the major portion of the pressure reducing operation such that the valve 17 need only take a relatively small pressure drop and still give adequate control. In still other installations, it may be found that the improved silencing and pressure reducing apparatus may provide the entire required control, and the chamber control valve, such as the valve 17, may be eliminated. Variations in the operation of the unit in controlling the stream velocity and the amount of pressure reduction may be effected by means of the depth of the packed bed within the chamber 1, as well as by means of the operation of the auxiliary by-pass control valves.

The accompanying drawing indicates the chamber containing the packing is of substantially uniform cross-section, however, in a slightly modified arrangement of the apparatus, the chamber may be constructed to taper slightly outwardly from the bottom to the top through the packed section. Thus, upon the packing becoming clogged in any way, an increased pressure exerted upwardly through the bed will more easily break loose the balls or other packing material, and clear the zone. Also the outlet pipes or conduits 10, from the by-pass openings, may connect to or join with the main gas stream from the outlet 3 of the silencing apparatus, or they may discharge independently to the atmosphere through independent stacks.

I claim as my invention:

1. A silencing and pressure reducing apparatus comprising a chamber having an inlet and an outlet at opposite ends thereof, a pair of spaced perforated plates extending across said chamber, a continuous bed of solid bodies extending from one of said plates to the other, a plurality of by-pass outlet conduits connected to said chamber between said plates and in direct communication with said bed, and a valve in each of said conduits.

2. The apparatus of claim 1 further characterized in that said solid bodies comprise balls of high temperature and erosion resistant material.

3. The apparatus of claim 1 further characterized in that said bed comprises refractory metal balls of varying diameter.

4. The apparatus of claim 1 further characterized in that said bed comprises refractory ceramic balls of varying diameter.

DONALD J. BERGMAN.

REFERENCES CITED

The following references are of record in the file of this patent:

UNITED STATES PATENTS

| Number | Name | Date |
|---|---|---|
| 157,548 | Shaw | Dec. 8, 1874 |
| 503,534 | Goff | Aug. 15, 1893 |
| 758,222 | Stone | Apr. 26, 1904 |
| 1,666,257 | Furnivall | Apr. 17, 1928 |
| 2,308,160 | Eckel | Jan. 12, 1943 |

FOREIGN PATENTS

| Number | Country | Date |
|---|---|---|
| 22,089 | Great Britain | Oct. 7, 1907 |
| 246,092 | Great Britain | Apr. 15, 1926 |
| 315,617 | Italy | Mar. 2, 1934 |